United States Patent Office 3,412,328
Patented Nov. 19, 1968

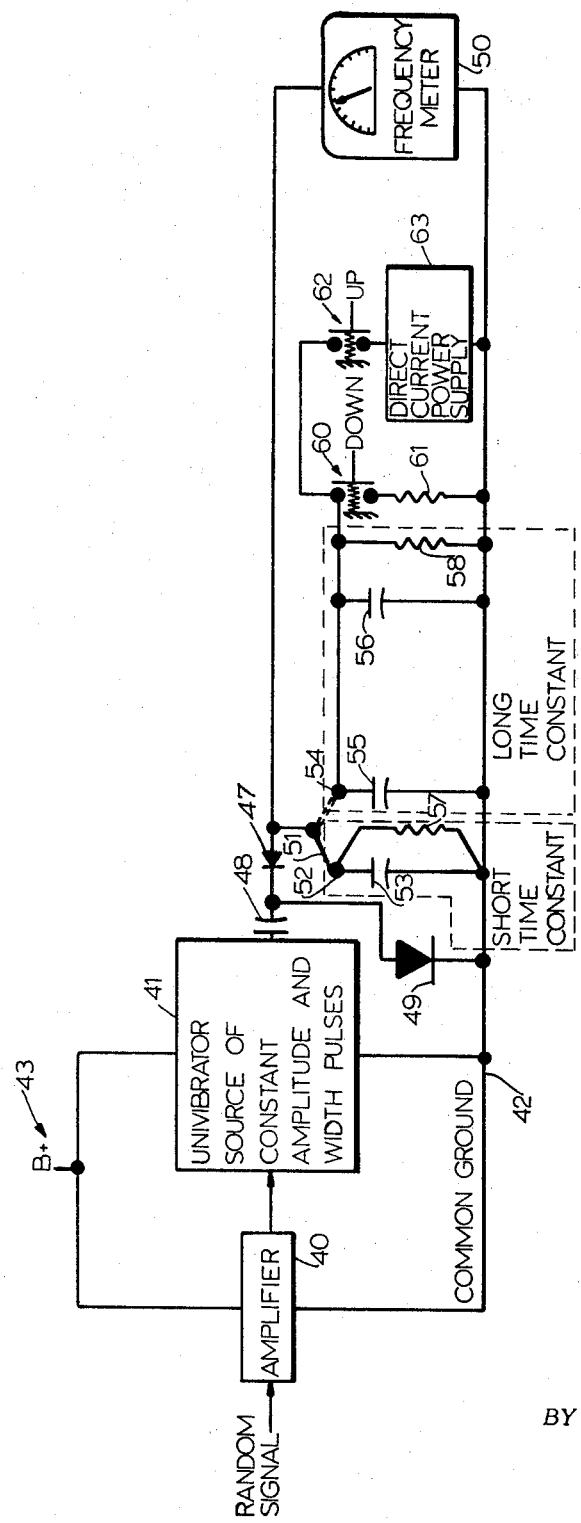

3,412,328
COUNTING RATEMETER WITH MANUAL
OVERRIDE OF LONG TIME CONSTANT
Andrew Lowery, Durham, N.C., assignor to Troxler
Electronic Laboratories, Inc., Raleigh, N.C., a corporation of North Carolina
Filed Aug. 9, 1965, Ser. No. 478,102
2 Claims. (Cl. 324—78)

ABSTRACT OF THE DISCLOSURE

A ratemeter circuit for frequency or rate counting as required for nuclear measuring gauges and the like includes both long and short time constant circuits and means to selectively boost or discharge the current from the long time constant circuit such that the operator by manual switching is able to obtain a quick approximate short time constant reading and to accelerate both up scale and downscale long time constant movements by overriding the normal functioning of the long time constant circuit.

With the advent of portable radiation detectors such as nuclear soil moisture and density gauges there has arisen a need for simple yet reliable frequency counting circuits having a wide range of count rates. When a counter or scaler is compared to the conventional ratemeter as a means of counting, the ratemeter exhibits one marked disadvantage in the amount of time required between readings. Even with this time disadvantage however the ratemeter has the advantage of a much lower cost, lighter weight and smaller power requirement.

With the foregoing in mind, an object of the present invention is to provide a ratemeter circuit which makes it possible to minimize or completely eliminate the delay conventionally encountered between readings of a ratemeter having a long time constant.

Another object is to provide a ratemeter circuit based on employment of a long time constant but which exhibits the quick reading characteristic of a short time constant type circuit.

A further object is to provide means in a ratemeter circuit based on a long time constant for overriding the effect of such long time constant whereby to obtain a relatively fast reading.

Another object is to provide means in a ratemeter circuit having both long and short time constants available for obtaining a quick and somewhat approximate reading based on a short time constant and based on the short time constant reading immediately thereafter obtaining a more accurate long time constant reading but with substantially less time than normally required.

Another object is to provide in a ratemeter circuit means for accelerating the movement of the needle when moving both up and down scales during and after a long time constant reading.

The foregoing and further objects will appear from the description when taken in connection with the accompanying drawing which shows only so much of a typical portable ratemeter circuit as is necessary to fully understand the principles and operation of the present invention. Such portable ratemeters conventionally employ a rechargeable direct current (D.C.) power supply.

The diagram of the drawing illustrates the circuitry of the invention as incorporated into the typical ratemeter circuit. Details of the various amplifier, univibrator, charger, voltage regulator, power supply, scale selection circuits and the like which are conventionally found in ratemeter circuits have been eliminated in order to more specifically point out the nature of the invention. Such associated circuits are well understood in the art and from the portions of the typical ratemeter circuit illustrated those skilled in the art will understand the invention. The signal whose frequency count is desired is first fed to the amplifier 40. The amplified signal is then employed to trigger a source of alternating current pulses of constant width and amplitude represented by the univibrator 41. These pulses are converted to direct current (D.C. by a coupling capacitor 48, diode 47, and diode 49. A common ground, established by wire 42, and a common B plus voltage source 43 are connected to the amplifier 40 and univibrator 41. The signal, as received, is random with respect to time.

Readings are taken with the frequency meter 50 which receives the current developed by univibrator 41 at the level established by the frequency of the signal entering amplifier 40. While termed a "frequency" meter those in the art will readily appreciate that meter 50 can read either in terms of "frequency" or "rate." The reading of meter 50 is, of course, effectively a current reading that is proportional to frequency. Meter 50 can be made to give either long time constant or short time constant readings by means of a manually operated switch 51. Switch 51 has two positions, the first position being one in which the pulses are fed through a short time constant network connected between a terminal 52 and ground 42 and comprising a capacitor 53 connected in parallel with a resistor 57. The values of capacitor 53 and resistor 57 are of course selected to give a relatively short time constant in the order of one to five seconds. In the second position of switch 51, indicated in dashed lines, the pulses are fed through a relatively long time constant network connected between terminal 54 and ground 42 and comprising parallel arranged capacitors 55, 56 and resistor 58. The values on this long time constant network are selected to give relatively long time values in the order of twenty to thirty seconds.

One of the main advantages of the circuit of the invention resides in the ability of the operator to speed up movement of the meter needle toward the correct reading when taking a long time constant reading and to speed up movement downscale when the operator desires to clear the circuit for taking of a new reading. In this regard there is provided a normally open, manually operated, switch 60 which when closed acts to dissipate any charge existing in capacitors 55, 56 through a parallel connected resistor 61 which connects to the common ground 42. Switch 60, as later described, acts as a "down" switch in the sense of being effective to move the meter needle downscale after a faulty or undesired reading based on a long time constant and the value of resistor 61 is relatively low with this purpose in mind. A further normally open, manually, operated, switch 62 when closed acts to connect a power supply 63 in parallel with capacitors 55 and 56 and is effective as an "up" switch. That is, when switch 62 is closed, the power supply 63 acts to supply current to the long time constant capacitors 55, 56 and to the meter 50. Such current acts to supplement current received by meter 50 from the univibrator 41 and the conventional associated circuits, not shown. This current supplement acts to force the needle upscale faster than it would normally travel without such current supplement. Power supply 63 may be the ratemeter power supply itself or a supplementary power supply and in either event is chosen and regulated to have an output current sufficient to accomplish the stated purpose of supplementing the normal meter current sufficient to accelerate but not damage the meter needle movement.

In operation, the operator first takes a reading with switch 51 connected to terminal 52 which reading can be made relatively quickly because of the short time constant character of the network composed of capacitor 53 and resistor 57. After observing this first reading, the operator then moves switch 51 so as to connect with terminal 54. The meter needle in the transition from the short time constant to the long time constant will drop back to zero and start slowly traveling back toward the correct reading, that is, the first reading. In order to speed up travel of the meter needle while under the influence of the long time constant character of capacitors 55, 56 and resistor 58, the operator next closes switch 62 which accelerates movement of the needle toward the correct or first reading previously obtained when switch 51 was connected to terminal 52. Due to the supplementary current fed by the power supply 63, the meter needle will reach the correct reading position in a relatievly short time interval. For example, with the conventional ratemeter a thirty-second time constant normally requires the operator to wait for 120 seconds or longer before reading the meter after a large signal change. Utilizing the present invention this time can be reduced with a proper selection of circuit values to a time in the order of thirty seconds or less.

As sometimes happens, the operator will cause the meter needle to overshoot the correct reading and it becomes necessary to move the needle back downscale for a new reading. In such event, the operator may close switch 60 which acts to discharge capacitors 55, 56 through resistor 61 thereby causing the meter needle to quickly move downscale while clearing the circuit for the taking of a new reading. It may also be noted that switches 60 and 62 are inherently made inoperative when switch 51 is connected to terminal 52 in the short time constant position which arrangement insures against damage to the meter 50.

In summary, the invention provides in a ratemeter circuit means for substantially reducing the time required for obtaining long time constant readings and for clearing the circuit of extraneous time constant charges when new readings are desired. The circuit of the invention however retains all of the known advantages of the long time constant circuit.

Having described the invention, what is claimed is:

1. In a ratemeter circuit for counting the frequency of a random signal arriving at a given point:
    (a) first circuit means to convert said signal to a direct current level proportional to the frequency thereof;
    (b) a ratemeter having frequency indicating means connected to said signal converting means and dependent on said level;
    (c) a short time constant network;
    (d) a long time constant network;
    (e) a first manually operated switch movable between a first position which connects said short time constant network in parallel with said meter enabling the obtaining of a quick approximately correct final reading of short time constant character and a second position which connects said long time constant network in parallel with said meter enabling the obtaining of a longer delayed reading of long time constant character;
    (f) second circuit means including a resistor and a second normally open manually operated switch effective when closed in conjunction with said first switch occupying said second position to connect said resistor in parallel with said long time constant network to cause said long time constant network to discharge through said resistor whereby to override said long time constant and to accelerate downscale movement of said meter; and
    (g) third circuit means for supplementing the direct current received by said meter when connected to said long time constant network including a direct current power source and a third normally open manually operated switch effective when closed in conjunction with said first switch occupying said second position to connect said meter in parallel with said source thereby to override said long time constant and to accelerate upscale movement of said meter.

2. In a ratemeter circuit as claimed in claim 1 wherein said second and third switches are operable to move said meter downscale and upscale respectively only when said first switch is in said second position.

References Cited

UNITED STATES PATENTS

| | | | |
|---|---|---|---|
| 1,757,193 | 5/1930 | Hotopp | 324—125 |
| 2,356,617 | 8/1944 | Rich | 324—125 X |
| 2,752,508 | 6/1956 | Zito. | |
| 3,023,362 | 2/1962 | Blizard et al. | 324—125 |

FOREIGN PATENTS

| | | |
|---|---|---|
| 760,838 | 11/1956 | Great Britain. |
| 1,124,146 | 2/1962 | Germany. |

RUDOLPH V. ROLINEC, *Primary Examiner.*

P. F. WILLE, *Assistant Examiner.*